(12) United States Patent  
Ferrara

(10) Patent No.: US 8,528,119 B2  
(45) Date of Patent: *Sep. 10, 2013

(54) IMPACT ENERGY MANAGEMENT METHOD AND SYSTEM

(75) Inventor: Vincent Ferrara, Wellesley, MA (US)

(73) Assignee: Xenith LLC, Lowell, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/534,160

(22) Filed: Jun. 27, 2012

(65) Prior Publication Data

US 2012/0266366 A1    Oct. 25, 2012

Related U.S. Application Data

(63) Continuation of application No. 12/857,753, filed on Aug. 17, 2010, now abandoned, which is a continuation-in-part of application No. 11/543,642, filed on Oct. 5, 2006, now Pat. No. 7,774,866, which is a continuation-in-part of application No. PCT/US2006/005857, filed on Feb. 16, 2006.

(51) Int. Cl.
    *A41D 13/00*      (2006.01)

(52) U.S. Cl.
    USPC .............................................. 2/455

(58) Field of Classification Search
    USPC ............. 2/16, 455, 94, 247, 67, 69, 108, 2.5
    See application file for complete search history.

(56) References Cited

U.S. PATENT DOCUMENTS

| | | | | | |
|---|---|---|---|---|---|
| 1,552,965 | A | * | 9/1925 | Smith | 293/110 |
| 1,560,825 | A | * | 11/1925 | Kelticka | 2/24 |
| 2,759,186 | A | * | 8/1956 | Dye | 2/413 |
| 3,144,247 | A | * | 8/1964 | Szonn et al. | 267/35 |
| 3,242,500 | A | * | 3/1966 | Derr | 2/412 |
| 3,447,163 | A | * | 6/1969 | Tojeiro et al. | 2/412 |

(Continued)

FOREIGN PATENT DOCUMENTS

DE      4336665 A1     5/1995  
FR      1572542 A      6/1969

(Continued)

OTHER PUBLICATIONS http://www.edizone.com/availabletechnologies.html (2 pages) (copyright 2009).

(Continued)

*Primary Examiner* — Tejash Patel  
(74) *Attorney, Agent, or Firm* — Bingham McCutchen LLP

(57) ABSTRACT

An impact-absorbing protective structure comprises one or more compressible cells. Each cell is in the form of a thin-walled plastic enclosure defining an inner, fluid-filled chamber with at least one small orifice through which fluid resistively flows. Each cell includes an initially resistive mechanism that resists collapse during an initial phase of an impact and that then yields to allow the remainder of the impact to be managed by the venting of fluid through the orifice. The initially resistive mechanism may be implemented by providing the cell with semi-vertical side walls of an appropriate thickness or by combining a resiliently collapsible ring with the cell. After the initially resistive mechanism yields to the impact, the remainder of the impact is managed by the fluid venting through the orifice. The cell properties can be readily engineered to optimize the impact-absorbing response of the cell to a wide range of impact energies.

3 Claims, 18 Drawing Sheets

(56) References Cited

U.S. PATENT DOCUMENTS

| | | | |
|---|---|---|---|
| 3,500,475 A * | 3/1970 | Otsuka | 2/421 |
| 3,600,714 A * | 8/1971 | Cade et al. | 2/83 |
| 3,609,764 A * | 10/1971 | Morgan | 2/414 |
| 3,668,704 A | 6/1972 | Conroy et al. | |
| 3,747,968 A * | 7/1973 | Hornsby | 293/110 |
| 3,782,511 A * | 1/1974 | Parfitt | 188/75 |
| 3,784,985 A * | 1/1974 | Conroy | 2/22 |
| 3,849,801 A * | 11/1974 | Holt et al. | 2/413 |
| 3,872,511 A * | 3/1975 | Nichols | 2/413 |
| 3,877,076 A * | 4/1975 | Summers et al. | 2/414 |
| 3,900,222 A * | 8/1975 | Muller | 293/110 |
| 3,971,583 A * | 7/1976 | Kornhauser | 293/110 |
| 3,999,220 A * | 12/1976 | Keltner | 2/413 |
| 4,038,700 A * | 8/1977 | Gyory | 2/413 |
| 4,064,565 A * | 12/1977 | Griffiths | 2/412 |
| 4,067,063 A * | 1/1978 | Ettinger | 2/413 |
| 4,075,717 A * | 2/1978 | Lemelson | 2/412 |
| 4,099,759 A * | 7/1978 | Kornhauser | 293/110 |
| 4,134,156 A * | 1/1979 | Gyory | 2/413 |
| 4,192,699 A * | 3/1980 | Lewicki et al. | 156/145 |
| 4,213,202 A * | 7/1980 | Larry | 2/456 |
| 4,370,754 A * | 2/1983 | Donzis | 2/463 |
| 4,453,271 A * | 6/1984 | Donzis | 2/456 |
| 4,534,068 A * | 8/1985 | Mitchell et al. | 2/414 |
| 4,566,137 A * | 1/1986 | Gooding | 2/413 |
| 4,586,200 A * | 5/1986 | Poon | 2/413 |
| 4,642,814 A * | 2/1987 | Godfrey | 2/462 |
| 4,704,746 A * | 11/1987 | Nava | 2/424 |
| 4,710,984 A * | 12/1987 | Asper et al. | 2/412 |
| 4,883,299 A * | 11/1989 | Bonar | 293/110 |
| 4,916,759 A * | 4/1990 | Arai | 2/414 |
| 4,970,729 A * | 11/1990 | Shimazaki | 2/414 |
| 5,042,859 A * | 8/1991 | Zhang et al. | 293/107 |
| 5,056,162 A * | 10/1991 | Tirums | 2/412 |
| 5,058,212 A * | 10/1991 | Kamata | 2/424 |
| 5,083,320 A * | 1/1992 | Halstead | 2/413 |
| 5,093,938 A * | 3/1992 | Kamata | 2/424 |
| 5,098,124 A * | 3/1992 | Breed et al. | 280/751 |
| 5,161,261 A * | 11/1992 | Kamata | 2/424 |
| 5,204,988 A | 4/1993 | Sakurai | |
| 5,204,998 A * | 4/1993 | Liu | 2/411 |
| 5,235,715 A * | 8/1993 | Donzis | 12/142 R |
| 5,263,203 A * | 11/1993 | Kraemer et al. | 2/413 |
| 5,336,708 A * | 8/1994 | Chen | 524/474 |
| 5,345,614 A * | 9/1994 | Tanaka | 2/425 |
| 5,388,277 A * | 2/1995 | Taniuchi | 2/422 |
| 5,412,810 A * | 5/1995 | Taniuchi | 2/424 |
| 5,561,866 A * | 10/1996 | Ross | 2/410 |
| 5,575,017 A * | 11/1996 | Hefling et al. | 2/418 |
| 5,678,885 A * | 10/1997 | Stirling | 296/24.4 |
| 5,713,082 A * | 2/1998 | Bassette et al. | 2/412 |
| 5,734,994 A * | 4/1998 | Rogers | 2/411 |
| 5,764,271 A * | 6/1998 | Donohue | 347/240 |
| 5,867,840 A * | 2/1999 | Hirosawa et al. | 2/414 |
| 5,911,310 A * | 6/1999 | Bridgers | 2/22 |
| 5,943,706 A * | 8/1999 | Miyajima et al. | 2/412 |
| 6,026,527 A * | 2/2000 | Pearce | 5/654 |
| 6,058,515 A * | 5/2000 | Kitahara | 2/412 |
| 6,065,158 A * | 5/2000 | Rush, III | 2/412 |
| 6,098,209 A * | 8/2000 | Bainbridge et al. | 2/456 |
| 6,260,212 B1 * | 7/2001 | Orotelli et al. | 2/410 |
| 6,332,226 B1 * | 12/2001 | Rush, III | 2/412 |
| 6,401,262 B2 * | 6/2002 | Bacchiega | 2/456 |
| 6,425,141 B1 * | 7/2002 | Ewing et al. | 2/412 |
| 6,446,270 B1 * | 9/2002 | Durr | 2/412 |
| 6,467,099 B2 * | 10/2002 | Dennis et al. | 2/455 |
| 6,519,873 B1 * | 2/2003 | Buttigieg | 36/29 |
| 6,560,787 B2 * | 5/2003 | Mendoza | 2/413 |
| 6,565,461 B1 * | 5/2003 | Zatlin | 473/446 |
| 6,604,246 B1 * | 8/2003 | Obreja | 2/411 |
| 6,658,671 B1 * | 12/2003 | Von Holst et al. | 2/412 |
| 6,704,943 B2 * | 3/2004 | Calonge Clavell | 2/411 |
| 6,908,209 B2 | 6/2005 | Miller | |
| 7,774,866 B2 * | 8/2010 | Ferrara | 2/455 |
| 7,895,681 B2 * | 3/2011 | Ferrara | 2/455 |
| 2002/0023291 A1 | 2/2002 | Mendoza | |
| 2003/0221245 A1 | 12/2003 | Lee et al. | |
| 2004/0117896 A1 | 6/2004 | Madey et al. | |
| 2004/0168246 A1 | 9/2004 | Phillips | |
| 2010/0282554 A1 | 11/2010 | Stone | |

FOREIGN PATENT DOCUMENTS

| | | |
|---|---|---|
| GB | 1316722 A | 5/1973 |
| GB | 1503483 A | 3/1978 |
| GB | 2287435 A | 9/1995 |
| WO | WO-9614768 A1 | 5/1996 |
| WO | WO-2006005143 A1 | 1/2006 |
| WO | WO-2006089235 A1 | 8/2006 |

OTHER PUBLICATIONS

Barth, J T et al. "Acceleration-Declaration Sport-Related Concussion: the Gravity of it All" Journal of Athletic Training; Sep. 2001; vol. 36, No. 3, pp. 253-256.

Hernandez, H. "Novel Helmet Liner Technology" pp. 1-6.

"Notification of Transmittal of the International Search Report and the Written Opinion of the International Searching Authority, or the Declaration", International Application No. PCT/US2007/021050, mail date Aug. 22, 2008, 13 pages.

* cited by examiner

IMPACT ENERGY MANAGEMENT METHOD AND SYSTEM

CROSS-REFERENCE TO RELATED APPLICATIONS

This application is a Continuation of U.S. patent application Ser. No. 12/857,753 filed, Aug. 17, 2010 which is a Continuation-in-Part application of Ser. No. 11/543,642 filed, Oct. 5, 2006, which is a Continuation-in-Part of PCT/US2006/005857 filed, Feb. 16, 2006. The contents of the above applications are incorporated herein by reference.

BACKGROUND OF THE INVENTION

1. Field of the Invention

This invention relates generally to an impact energy management method and system. More specifically, it relates to an impact energy management method and system which is designed to protect an impacted object or body from damage due to impacts and which has properties that are readily customized to provide optimum impact-attenuating responses over a wide range of impact energies.

2. Background Information

A. The Physics of Colliding Objects

An object in motion possesses kinetic energy (KE), which is a function of its mass (m) and velocity (v), described by the equation:

$$KE = \tfrac{1}{2} m v^2 \qquad (1)$$

When that object collides with another object, the energy is transferred, imparting a Force (F). The force transmitted is a function of two primary relationships.

First, Force (F) imparted to an object is equal to the object's mass (m) and its resulting acceleration (a), as governed by Newton's Second Law of Motion, Force=mass×acceleration or F=ma. Acceleration (a) measures the object's change in velocity ($\Delta v$) over time (t) (change in velocity can be positive or negative, therefore acceleration can represent either a positive or negative quantity), thus Newton's Law can be re-written as follows:

$$F = m((\Delta v)/t) \qquad (2)$$

From this equation, it is apparent that one way to reduce the Force imparted to an object of fixed mass (m) is to prolong the time (t) over which the object changes velocity, thus reducing its acceleration.

Second, Force (F) is a result of the distance (d) over which the object's Energy (E) (in the form of kinetic energy) is transferred, giving the equation:

$$F = E/d \qquad (3)$$

From this equation, it is apparent that another way to reduce the Force (F) of an impacting object with a given amount of Energy (E) is to prolong the distance (d) over which the object's Energy (E) is transferred.

A third relationship governs the effect of an imparted force. Pressure (P) describes the concentration of Force (F) over the area (A) within which the Force (F) is imparted and is governed by the equation:

$$P = F/A \qquad (4)$$

From this equation, it is apparent that the pressure (P) of an impact can be reduced by reducing the Force (F) imparted by the impacting object or by increasing the Area (A) over which that Force (F) is imparted.

Given the above three relationships, it is apparent that the methods to reduce the damage caused by an impacting object are to decrease the level of Force (F) imparted by prolonging the time (t) over which that object accelerates (or decelerates) or the distance (d) over which energy is transferred, or to increase the area (A) over which that Force (F) is spread. An ideal system would employ all three methods to reduce impact damage.

Force is measured in Newtons (1 N=1 kg-m/s$^2$) or pounds (lb): mass is measured in kilograms (kg) or pounds of mass (lb-m): and acceleration is measured in meters per second per second (m/s$^2$) or feet per second per second (ft/s$^2$). A commonly known force is Weight (w) which measures the force of gravity acting on an object. It is equal to the object's mass (m) multiplied by the acceleration due to gravity (g), which is 9.81 m/s$^2$ or 32 ft/s$^2$. When comparing forces that act on objects of the same or similar mass (m), it is common to express them in terms of units of acceleration rather than units of force (recall F=ma). In such cases, acceleration is often expressed as multiples of the acceleration of gravity, or in "g's". Thus, an object can be said to have experienced an "80-g" force, or a force equal to 80 times the force of gravity. In general, it can be assumed that higher forces are more damaging to an object than lower forces.

In any activity in which two objects are likely to collide, it is common practice to utilize protective structures or materials designed to manage the energy of the collision and to minimize the damage to the impacted object caused by the collision. A common method of testing the efficacy of such protective systems is to impart a known Force (F) to one side of the protective structure or material and to measure the force transmitted through the system to the other side. Often this is accomplished with a "drop test." In this type of test, an impacting object is dropped (or mechanically accelerated) from a given height onto a fixed surface, which is adapted to register the force imparted to it by the impacting object. It is typical for the impacted surface to be a steel plate, beneath which is attached a "force ring," which is capable of registering the forces delivered to the plate, and transmitting a signal representative of the forces to a data capture system, typically a programmed computer. The combination of steel plate and force ring is termed a "force plate." Thus a useful comparison of protective systems involves placing the energy management system or material onto the force plate, dropping an impacting mass onto the system or material, and registering the forces transmitted through the system or material to the force plate as a function of time.

The greater the height from which an object of fixed mass is dropped, the higher the velocity it will attain before impact, and the more kinetic energy it will possess to transfer to the impacted surface. The force of that impact over time is represented in a Force/Time curve, such as the curve shown in FIG. 1 of the accompanying drawing.

It is important to note that all objects with the same mass and same impact velocity will possess the same amount of energy. The way in which that energy is managed by a protective structure or material will determine the shape of the Force/Time curve. For a given object impacting with a given speed, the area under the Force/Time curve, know as the Impulse (I), will be the same, regardless of the shape of the curve. However, the shape of that curve is a representation of the force profile, which can vary significantly, depending on the energy management system being employed. In general, when managing impacts, the level of peak force attained can be considered to be the most critical indicator of an energy management system's efficacy.

B. Foam as an Impact-Absorbing Material

One of the most common materials used to protect objects from impact forces is foam. Solid foams form an important class of lightweight cellular engineering materials, and are used in many applications where impacts are common, such as in athletic activities (e.g., protective headgear) and automotive applications (e.g., dashboard coverings). The most general definition of foam is a substance that contains a relatively high volume percentage of small pores, and which is formed by trapping gas bubbles in a liquid or solid. The pores allow foam to deform elastically under impact, and the impact energy is dissipated as the material is compressed. In general, foams decrease impact pressure by spreading forces over a wide area and by prolonging the distance and time over which impacts occur and thus reducing the level of force transmitted.

While foams have been a mainstay in impact protection for decades, they rely solely on material deformation for their energy management capabilities. This presents two major limitations.

First, relying on material properties severely limits the adaptability of the foam. Foams can be customized to respond optimally to only a very specific range of impact energies, either by changing the density or geometry (thickness) of the foam, but foams are not able to adapt their response to a wide range of impact energies. This can lead to a mismatch of the foam's functional capability to the impact energy, making the foam either "too soft" or "too hard" for the impact. A foam that is too soft (not dense enough) for an impact will compress too quickly or "bottom out" and transmit too much force to the impacted body. A foam that is too hard (too dense) for an impact will not compress enough and will decelerate the impacted body too quickly.

When foam becomes fully compressed under impact, it acts as a rigid body and loses its ability to absorb energy. The impact energy remaining after the foam is fully compressed is transmitted directly through the foam to the impacted body. A foam that is too soft for a given impact will compress too quickly, which allows large forces to be delivered to the impacted body and effectively decreases the functional distance and time over which the impact occurs. A Force/Time curve for a foam that is too soft for a given impact is shown in FIG. 2 of the accompanying drawing.

In the initial phase of impact, the foam does not slow the object enough, and this is represented by an early, only gradually increasing line segment on the Force/Time curve of FIG. 2, from 0 to 0.075 seconds. Next, during time period from 0.075 to 0.0125 seconds, the foam quickly compresses and packs down, at which point deceleration occurs in a short distance and time, shown as the spike in the curve of FIG. 2. This curve demonstrates that the majority of the deceleration occurs in a brief period of time and distance, thus delivering a high peak force, which is the most damaging to the impacted body. In addition, the potential for localized compression of the soft foam decreases the area over which the force may be transmitted, therefore potentially increasing the pressure and damage of the impact. Due to potentially catastrophic consequences of bottoming out within a small area, soft foams cannot be used in situations that may involve moderate or high energy impacts.

Conversely, a foam can also be too hard (too dense) for a given impact. If the foam is too hard, it will present too much resistance in the early phase of the impact, and will not compress enough (will not "ride-down" enough) to prolong the distance or time of impact. It thus halts the object suddenly, represented as the sharp continuous rise to a high peak force in the Force/Time curve shown in FIG. 3 of the drawing. This is most evident with respect to the curve labeled "Trial 1" in FIG. 3.

These dense foams function primarily to spread impact area and reduce pressure to on the area, but can still lead to high forces. Another problem with dense foams is the potential for high "rebound," in which the foam temporarily stores impact energy in compression, then re-delivers it upon rebound. Thus, dense foams are useful for reducing pressure of impacts, but their ability to significantly reduce peak force is limited.

Even when foams happen to be matched to the impact (which may occur by chance, or by specific engineering of foams to meet certain very specific energy level standards), they still have inherent limitations. One major limitation is the inability of the foam to "ride-down" enough to prolong the distance and time of the impact. Most foams will ride-down to a maximum of 60-70% of their original height, which limits the distance and time over which the impact occurs, and leads to higher peak forces. Given the limited ability to customize foams, for a given material operating at a given energy level, this presents only one option to further reduce peak forces. Specifically, the only way to further reduce peak forces is to lower the density of the foam and increase its height or thickness. This modification can serve to lower the peak forces, but due to the inherent properties of foam, which cause it to become progressively denser under compression, the curve is still hump- or bell-shaped, limiting the foam's ability to lower peak force. Further, an increased thickness of foam may be cosmetically or practically unacceptable for certain applications, and may also increase the bulk and weight of the energy management system to unacceptable levels.

Given the properties of foam, once it is manufactured, it will have a certain energy level at which it performs "optimally," but this performance still leaves great room for improvement, and outside of its optimal range the foam's function will be even worse, either being potentially too hard or too soft for a given impact. Thus, foam lacks an ability to adapt to the potential for impacts of different energy levels. This leads to the use of foams designed simply to perform best at a certain standard, or designed to prevent only the most critical forms of damage, but leaving other forms of damage poorly addressed. FIG. 4 of the drawing includes two Force/Time curves for a given foam generated in response to two different impact energies. As is apparent from FIG. 4, the foam's performance declines with increased impact energy.

The second major limitation of foam is that all foams will show decline in function after repeated impacts. Some common foams, such as expanded polystyrene (EPS), are designed for only a single impact. Other foams, even though designed to be "multi-impact," will also decline in function after repeated impacts. This lack of durability can present practical as well as safety limitations with the use of foams. FIG. 5 of the drawing includes a series of Force/Time curves for successive impacts to a "multi-impact" foam illustrating the decline in the foam's performance with repeated impacts.

In summary, the problems associated with foam as an impact-absorbing material include:
 (a) limited adaptability;
 (b) non-optimal impact energy management;
 (c) tradeoff between energy absorbing ability and amount of material used; and
 (d) poor durability.

While we have specifically focused on the limitations of foams, those skilled in the art will appreciate that other mechanisms of energy management may be employed, and that they may also be subject to the same or similar functional limitations as foam.

There is thus a need in the art of impact energy management for a novel system capable of addressing the limitations of foams and other conventional energy management systems.

SUMMARY OF THE INVENTION

In accordance with the present invention, a novel impact energy management method and system is provided which is designed to address the limitations of foam and other conventional energy management systems as discussed above.

In accordance with the present invention, an impact energy management method is provided for protecting a body from damage due to impacts imparted to the body which comprises the steps of:

(a) placing a protective structure over a portion of the body to be protected, the protective structure being capable of reducing forces of an impact that are transferred through it to the body;

(b) providing the protective structure with a first impact-absorbing mechanism that resists yielding in response to an initial phase of the impact and that yields to the impact after the initial phase of the impact; and (c) providing the protective structure with a second impact-absorbing mechanism that operates after the initial phase of the impact such that the forces of the impact that are transferred to the body remain substantially constant throughout the remainder of the impact.

In accordance with an illustrative embodiment the invention, the protective structure comprises one or more impact-absorbing compressible cells, either alone or in combination with other impact-absorbing materials and/or layers. Each cell is in the form of a thin-walled enclosure of a thermoplastic material defining an inner, fluid-filled chamber with at least one orifice. Each cell is adapted to resist an impact applied to it during the initial or early phase of the impact, and then deliberately yield to permit the fluid in the inner chamber of the cell to manage the remainder of the impact by venting fluid through the orifice. Each cell is further adapted to return to its original shape, and the orifice is adapted to permit rapid refill of the fluid in the inner chamber of the cell, so that after the impact, the cell is ready to accept and attenuate additional impacts.

In the preferred embodiment of the invention, the cell has a substantially round, symmetrical disk shape and is provided with side walls that are semi-vertically oriented and of a thickness such that they resist collapse during the initial or early phase of an impact on the cell and such that they later buckle outwardly to allow the fluid in the cell to manage the remainder of the impact by venting through the orifice. By carefully selecting the properties of the cell, such as the material from which the cell is fabricated, the thickness of its walls, the geometry of the cell, the fluid content of the cell and the size, configuration, location and number of venting orifices, the cell can be customized to provide an optimal response to impacts over a wide range of impact energies.

Various alternative embodiments of protective compressible cell structures are disclosed.

BRIEF DESCRIPTION OF THE DRAWINGS

The foregoing and other objects, features and advantages of the invention will be better understood by those skilled in the art from the following detailed description of illustrative embodiments taken in conjunction with the accompanying drawings in which.

DETAILED DESCRIPTION OF ILLUSTRATIVE EMBODIMENTS

Figure 6:
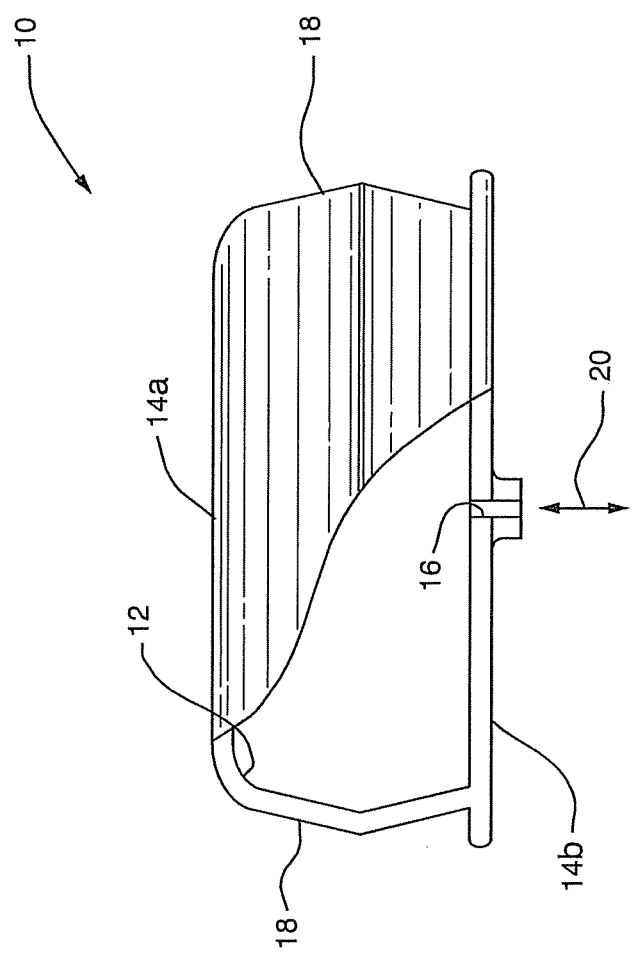
FIG. 6 is a side view, partly in section, of a compressible cell embodied in accordance with the invention.
Figure 7:
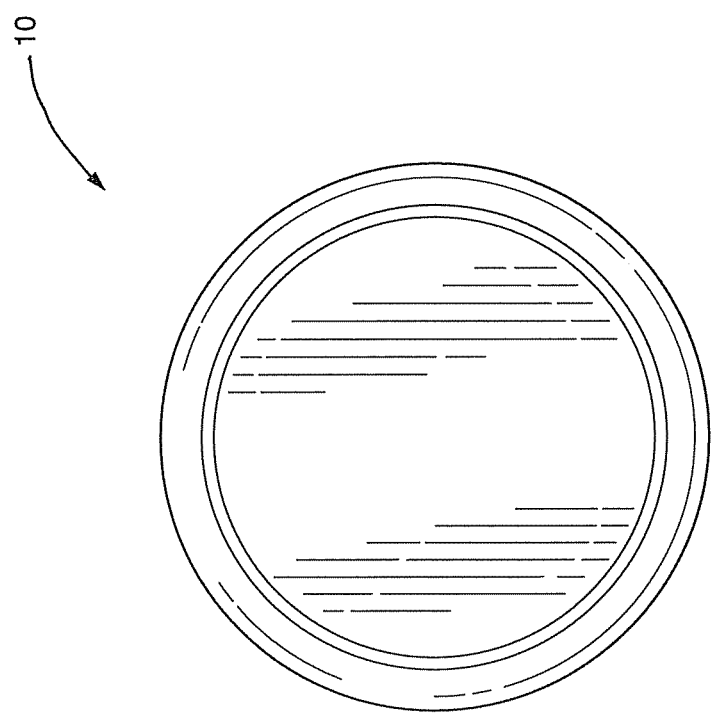
FIG. 7 is a top view of the cell of FIG. 6, illustrating its generally round, symmetrical shape and configuration.

A compressible, impact-absorbing compressible cell 10 embodied in accordance with the invention is shown in FIGS. 6 and 7 of the drawing.

In the illustrative embodiment of FIGS. 6 and 7, the cell 10 is made from a thermoplastic material, such as a thermoplastic elastomer (TPE) material, formed into a thin-walled, hollow enclosure 12 with a top wall 14a and a bottom wall 14b and an orifice 16 through its bottom wall 14b. The side walls 18 of the cell 10 are oriented semi-vertically, such that they provide an initial resistance to an impact on the cell 10, but then strategically buckle outwardly to allow the fluid in the cell 10, in this case air, to manage the remainder of the impact by venting through the orifice 16, as indicated by the air flow arrow 20. The resilient properties of the thermoplastic material from which the cell 10 is fabricated, coupled with the refill of air through the orifice 16, allow the cell 10 to quickly return to its original shape after impact.

FIG. 7 is a top view of the cell 10, showing its generally round and symmetrical disk shape and configuration. This generally symmetrical shape allows the cell to respond consistently regardless of where on the cell 10 the impact is applied and regardless of the angle of the impact relative to the cell 10.

The basic concept of the cell 10 specifically addresses the limitations of conventional foams and other similar energy management materials and structures, and is different from other air systems previously employed in energy management systems. First, the cell 10 provides multiple customization options, including selection and alteration of the properties of the thermoplastic material from which it is fabricated, the thickness of its walls, the geometry of the cell, the fluid content of the cell, and the size, configuration, location and number of venting orifice(s). By carefully selecting and adjusting these properties, in coordination with one another, the function of the cell 10 can be customized, allowing for a more robust functional range than has heretofore been possible with conventional foams and other systems. Careful calibration of these several properties will allow those skilled in the art to determine the optimum combination based on the particular application to which the cell 10 is to be put.

Figure 8:
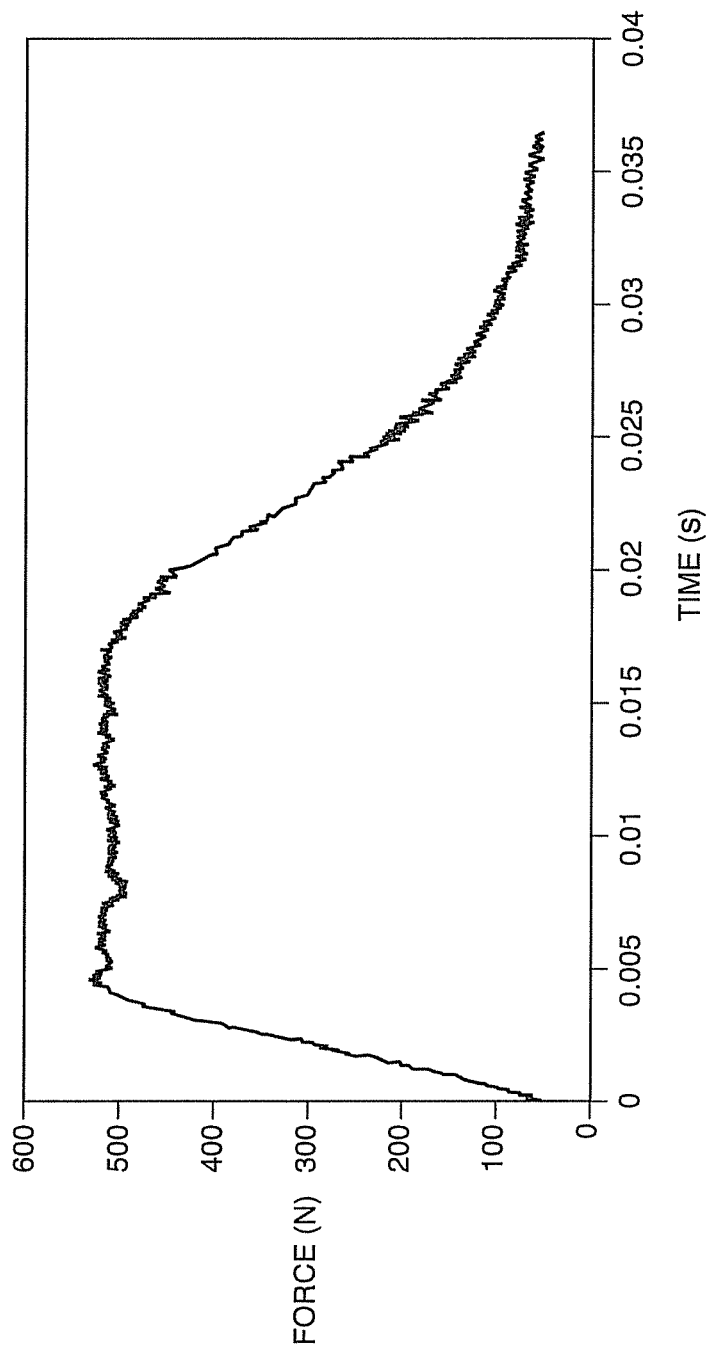
FIG. 8 is a Force/Time curve for a cell such as that shown in FIG. 6, illustrating how the cell can be customized to produce a nearly trapezoidal and flattened force response.

Second, the cell 10 serves to manage impact energy in a unique way. It will be recalled from above that, for an object of a given mass (m) traveling at a given velocity (v), that object's Impulse, or area under its Force/Time curve, will be the same. However, the manner in which the impact-absorbing cell 10 manages that Impulse will determine the profile of the Force/Time curve. Recall that even optimal foams will yield a bell- or hump-shaped Force/Time curve. However, the cell 10 allows the same Impulse to be managed in a different way from foam. As opposed to the bell- or hump-shaped curve, the cell 10, due principally to its initially resistive mechanism, manages the Impulse such that the Force/Time curve becomes nearly trapezoidal, rising rapidly to a plateau and then, due principally to the fluid venting mechanism, displays a significant flat portion throughout much of the remainder of the Impulse before it returns to zero. Thus, the cell 10 can reduce the peak forces that it transfers by managing the Impulse such that its Force/Time curve actually is "flattened". An example of a flattened Force/Time curve of the type yielded by the cell 10 of the invention is shown in FIG. 8 of the drawing.

In order to manage this Impulse in such a fashion that the normally bell-shaped Force/Time curve becomes nearly trapezoidal and flattened, the above-mentioned properties of the cell 10, namely, material, wall thickness, cell geometry, fluid content and size, configuration location and number of orifices, are selected in coordination with each other to yield the desired response. Specifically, these properties are selected so that, in the initial part of the Impulse, the initially resistive mechanism, for example, the collapsible side walls 18 of the cell 10, serve to begin the deceleration of the object, as represented by the steeply inclining initial portion of the Force/Time curve of FIG. 8, for the time period from 0 to 0.005 seconds. Once the side walls 18 of the cell 10 start to collapse and buckle outwardly, the impact is managed by the fluid venting from the cell 10 through the orifice 16, which is represented by the flat portion of the curve of FIG. 8, for the time period from 0.005 to 0.02 seconds.

One of the major reasons the cell 10 is able to better manage impact energy is that the fluid venting permits the cell 10 to "ride-down" to a more optimal distance than foams; in most cases, depending on the particular wall thickness of the cell 10, it can readily compress to over 90% of its original height. This compressive ability allows the impact to occur over greater distance and time than foams. Moreover, the fluid in the cell 10 does not become substantially more dense during compression, thus allowing for a more constant resistance over time and distance, as opposed to foams which become progressively denser with compression and lead to a spiked curve. The increased ride-down and constant density of the cell 10 yield a flatter Force/Time curve, indicating a "softer landing" to the impacting object.

Figure 1:
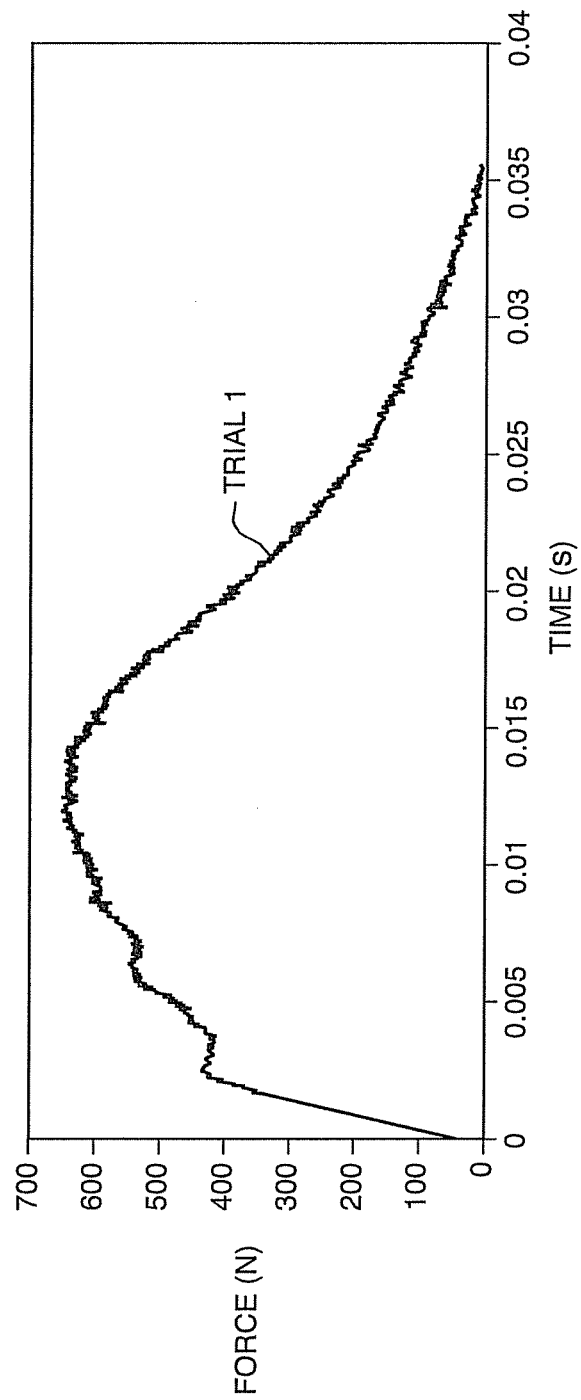
FIG. 1 is a typical Force/Time curve for an impact-absorbing material, showing the force transmitted by the material as a function of time.
Figure 2:
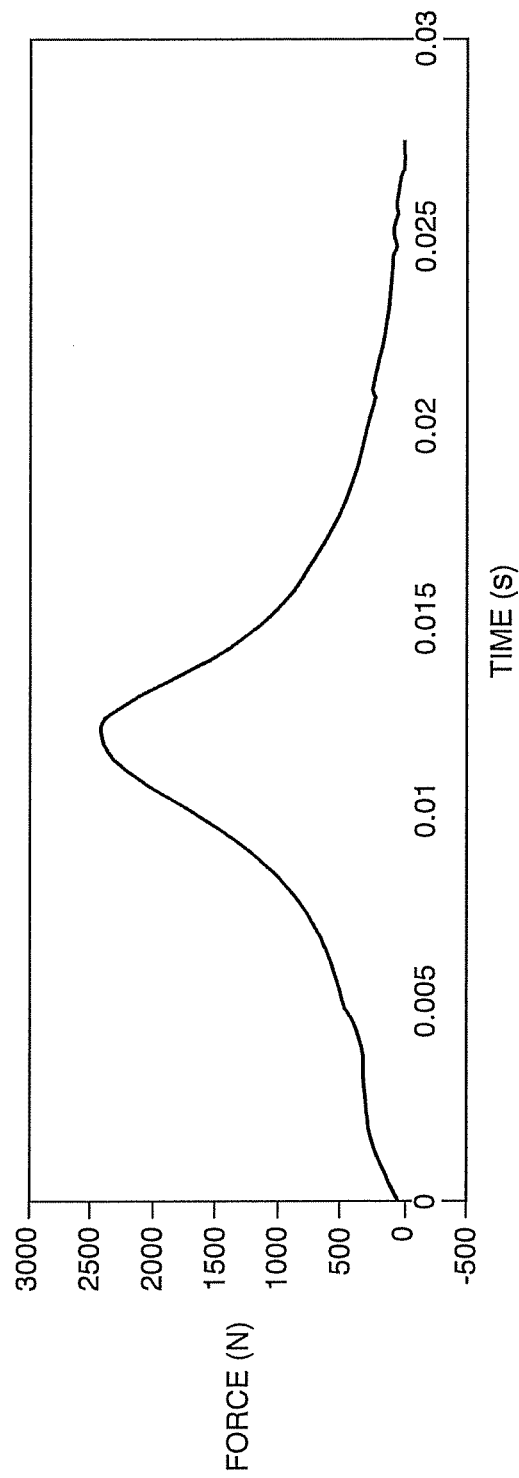
FIG. 2 is a Force/Time curve for a foam material that is too "soft" for the impact applied to the foam.
Figure 3:
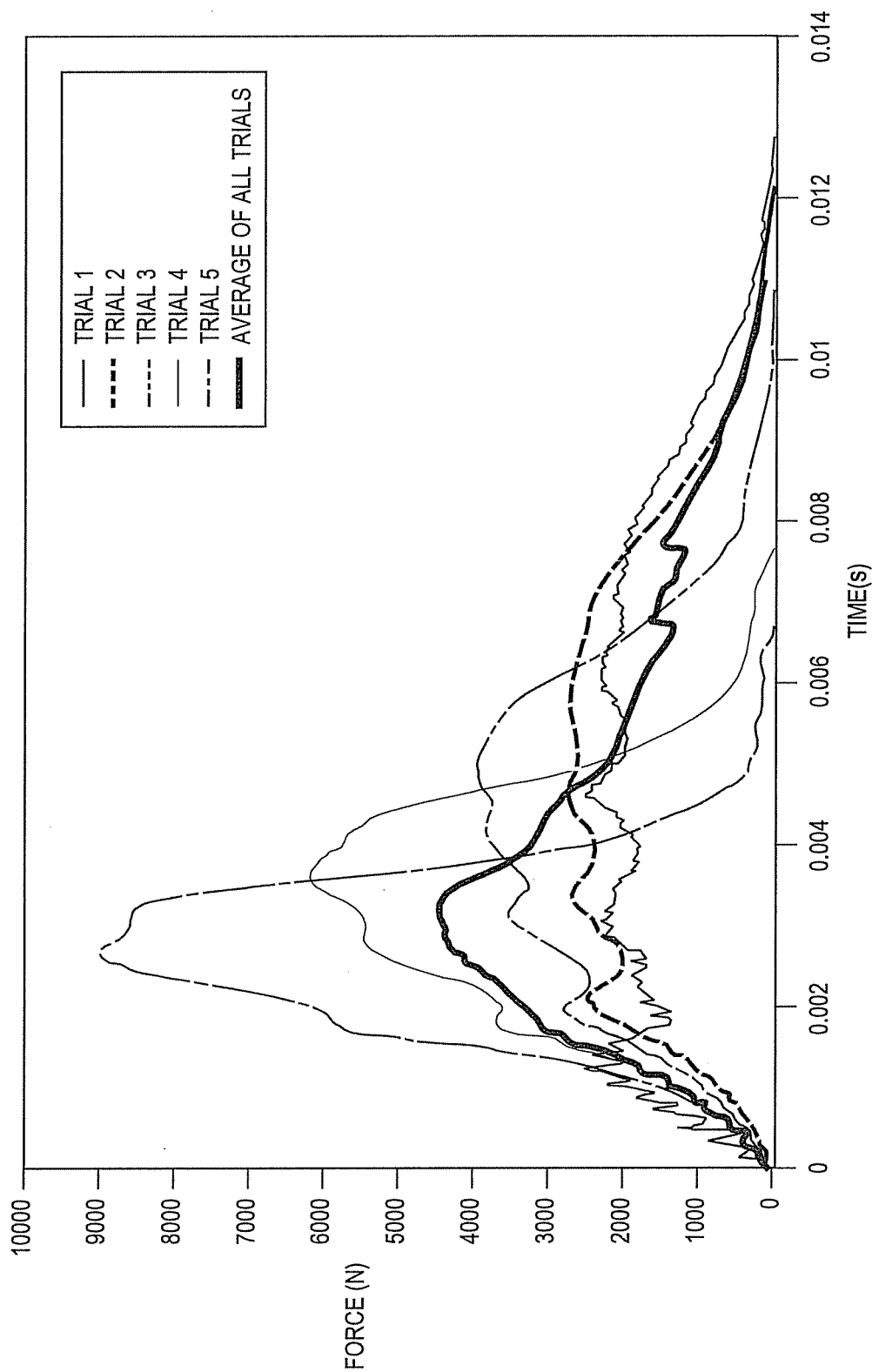
FIG. 3 is a series of Force/Time curves for a foam material that is too "hard" for a given impact (i.e., Trial 1) applied to the foam.
Figure 4:
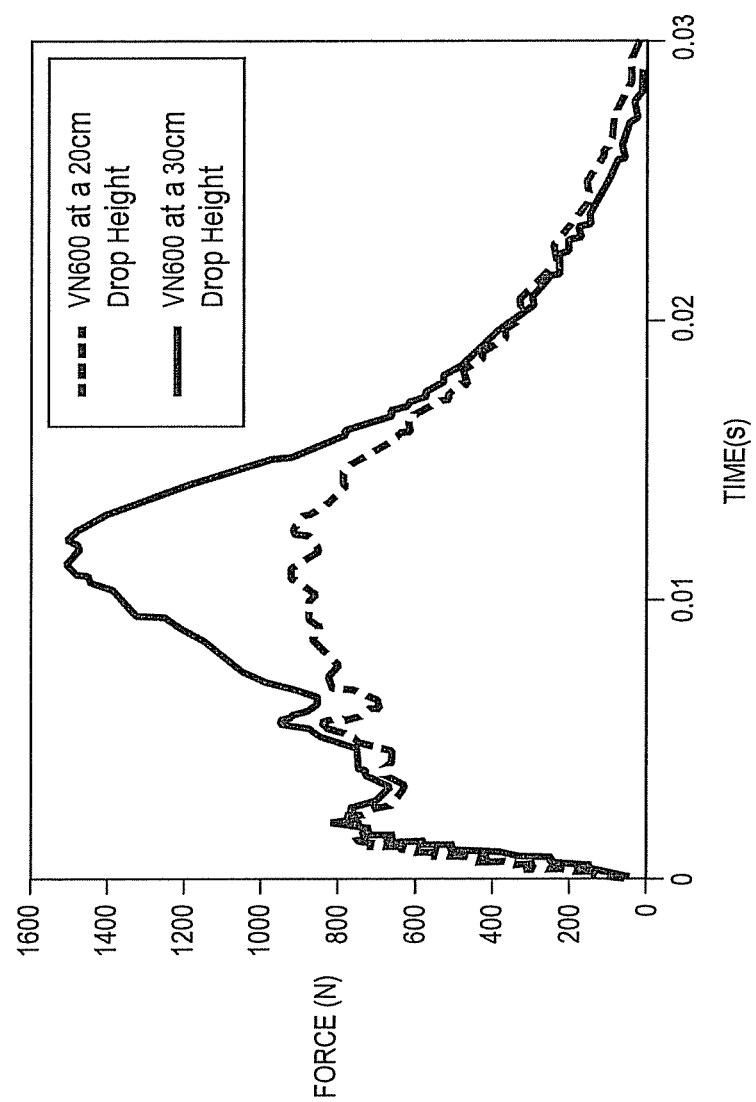
FIG. 4 shows two Force/Time curves for a given foam illustrating the change in the performance of the foam in response to different impact energies.
Figure 5:
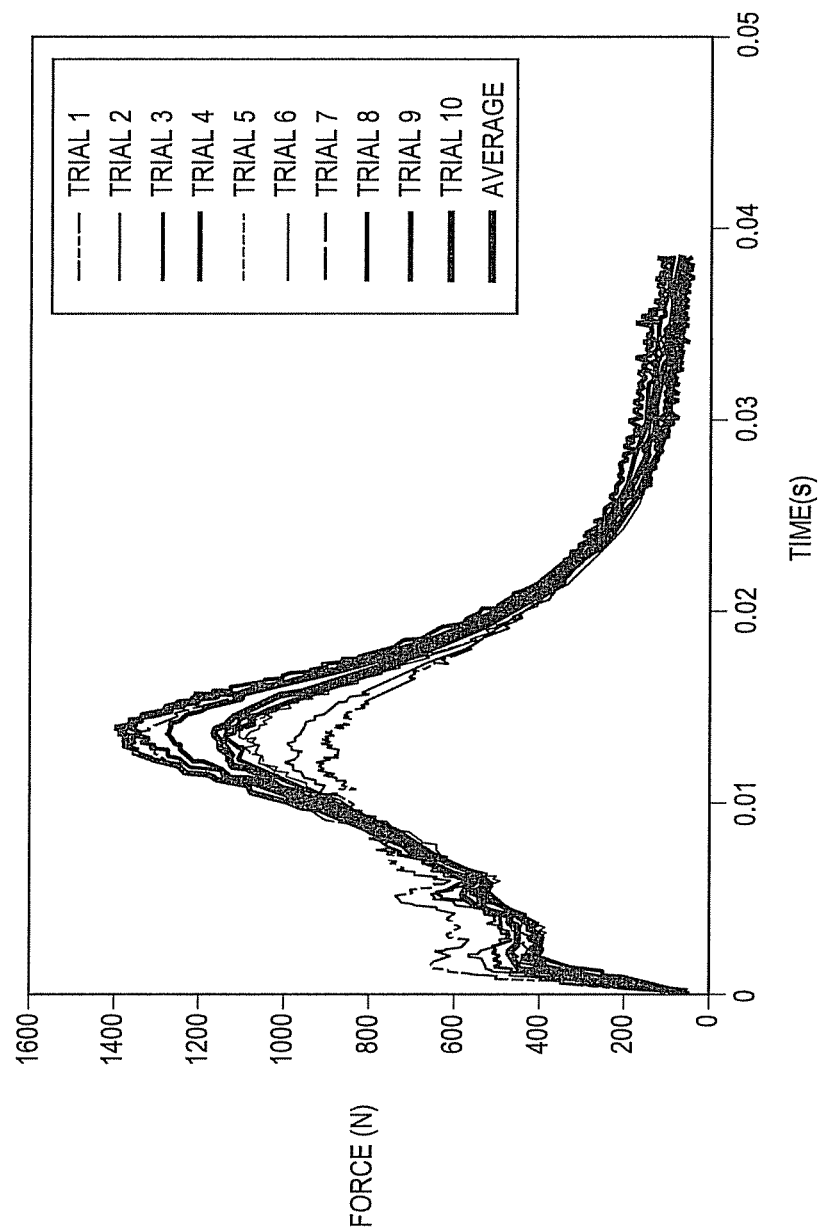
FIG. 5 is a series of Force/Time curves for a foam material illustrating the decline in the performance of the foam as a result of repeated impacts.
Figure 9:
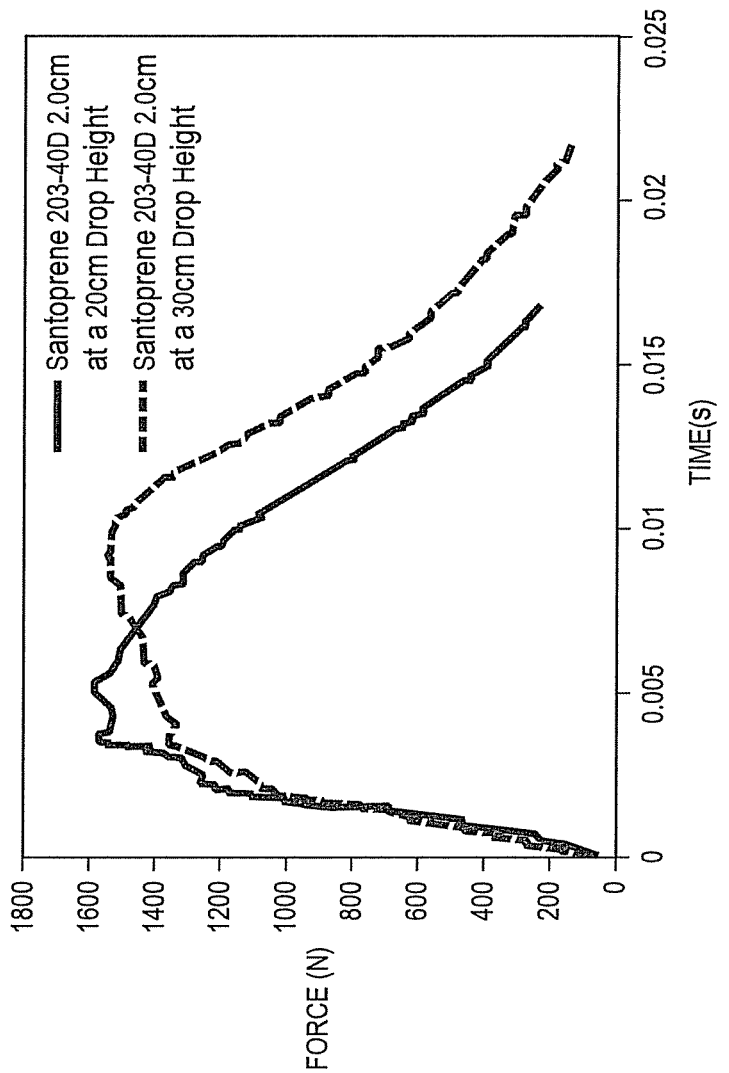
FIG. 9 shows two Force/Time curves for a cell such as that shown in FIG. 6, illustrating the response of the cell to two different impact energies.

Another major benefit of the cell 10 is its ability to adapt to different impact energy levels. This benefit results generally from the properties of fluids under compression. In this case, with increased energy of impact, the fluid in the inner chamber 12 of the cell 10 becomes increasingly turbulent and does not flow as easily through the is orifice 16 as compared to its flow under lower energy impacts. Thus, the fluid actually behaves as a stiffer mechanism under high impact energy as compared to its softer behavior under lower impact energy. This adaptation provides more optimal energy management over different impact energy levels. An example of this adaptation of the cell 10 is shown in FIG. 9 of the drawing. FIG. 9 shows the Force/Time curves for a compressible cell such as cell 10 at two different impact energy levels; from these curves, it is apparent that the peak forces of the two impacts are relatively the same, despite the increased energy of impact and size of Impulse in the second curve. This adaptation provides a valuable advantage over foams, as is evident from a comparison of the curves of FIG. 9 to the curves for a single foam at two different impact energy levels shown in FIG. 4 of the drawing.

Finally, the cell 10 has the potential for exhibiting greater durability than foams. Depending on the material chosen for the cell 10, and with the potential for combining the cell 10 with a complementary energy management component, such as discussed in connection with the embodiments of FIGS. 13, 14 and 16 below, the cell 10 can exhibit consistent impact-absorbing performance with little or no decline in function even after repeated impacts.

It is important to note that the key properties of the cell 10 discussed above are optimized in any particular design in order to deliver the unique Impulse management characteristics also discussed above. If the initially resistive mechanism of the cell 10, e.g., the collapsible side walls 18, is too stiff, the cell 10 will behave similarly to a dense foam; if the initially resistive mechanism (e.g., side walls 18) is too soft, the cell 10 will behave similarly to a low density foam. If the fluid is not vented from the orifice 16 properly, the cell 10 will not respond properly after the initial impact. If, for example, the orifice 16 is too large, the air does not provide resistance during venting and the cell 10 behaves similarly to a soft foam; if the orifice 16 is too small, the air becomes trapped and behaves like a spring, thus imparting an undesirable bouncing effect as a opposed to a dampening effect.

Figure 10:
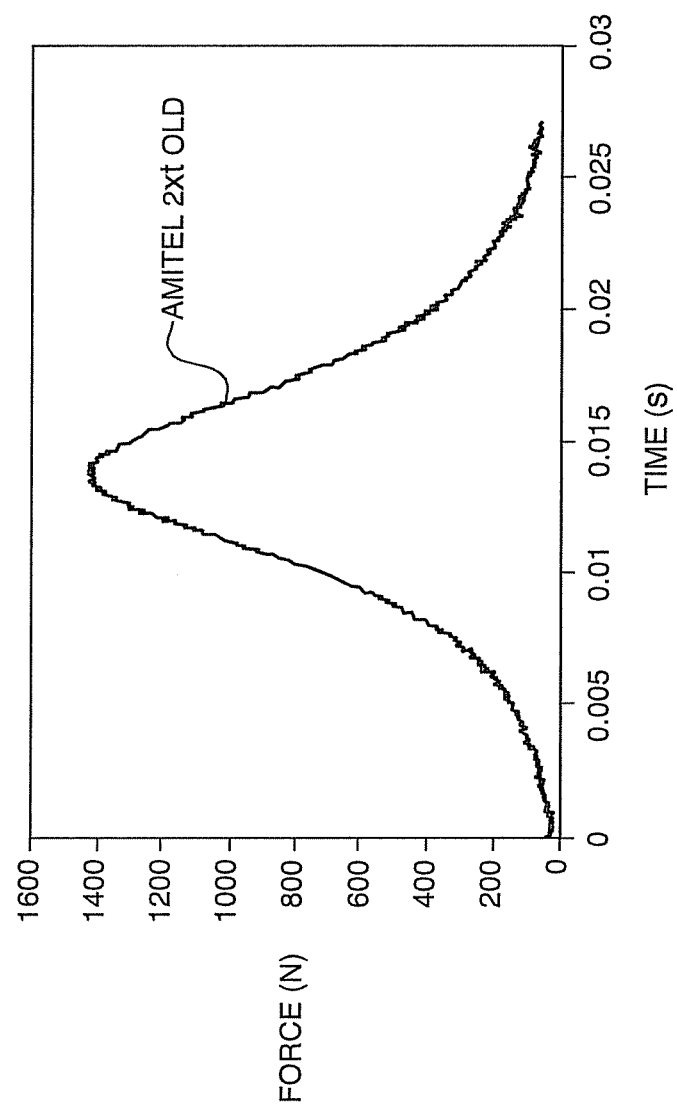
FIG. 10 shows a Force/Time curve for a compressible cell having a saucer shape, with no initially resistive mechanism.
Figure 11:
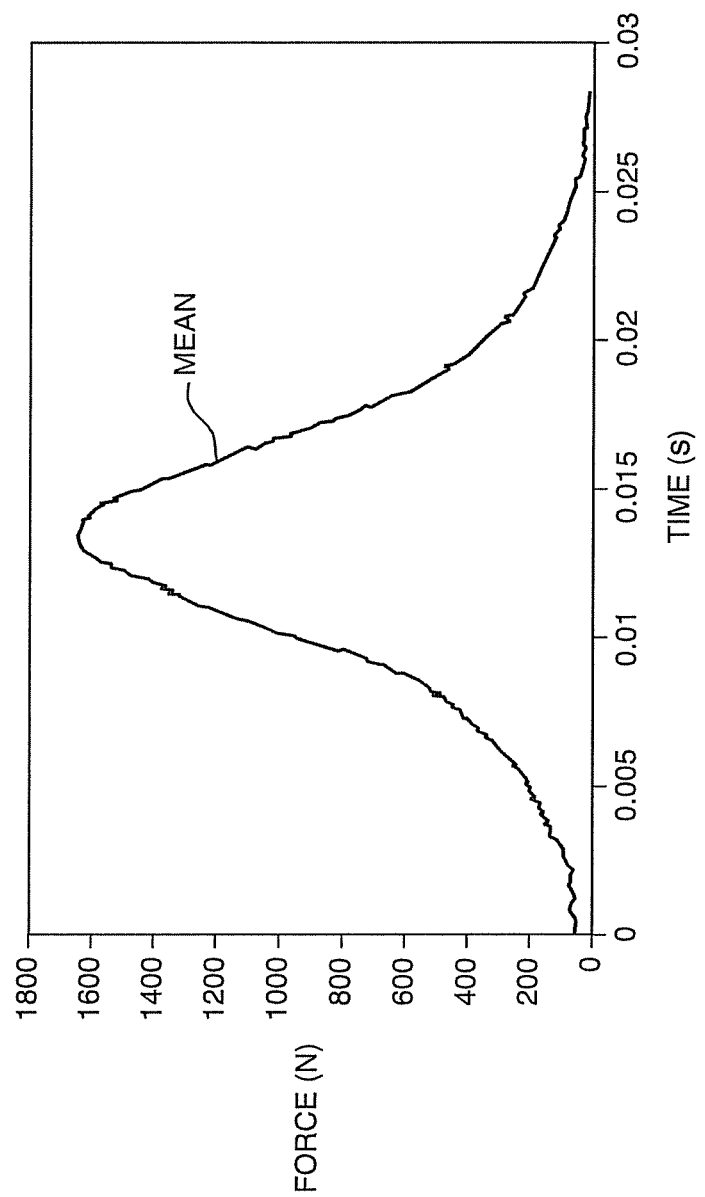
FIG. 11 shows a Force/Time curve for a compressible cell having bellows-like side walls, again with no initially resistive mechanism.

It is also important to note that not all hollow fluid-filled cavities or air chambers will manage energy in this unique manner described above. The use of air as an energy management system has been widely employed, but in other forms suffers from limitations. Force/Time curves for two other types of air-filled cells without any initially resistive mechanism are shown in FIGS. 10 and 11 of the drawings. FIG. 10 corresponds to a vented, compressible cell in the form and shape of a disk or flying saucer, with no initially resistive mechanism. FIG. 11 corresponds to a vented compressible cell with bellows-like or corrugated side walls, again with no initially resistive mechanism.

The cells whose Force/Time curves are illustrated in FIGS. 10 and 11 fail to provide enough initial resistance to the impact, as evidenced by the early portions of the curves, which only gradually increase before the curve quickly ramps to a high peak force. These curves look analogous to those of softer foams. Given the compressibility of air, if an initial resistive mechanism is not incorporated in the cell, it will compress too rapidly and fail to yield the rapidly rising, flattened trapezoidally shaped curve. Conversely, if the cell is sealed and pressurized, it may become too stiff and not yield enough to manage energy properly, and may again create an undesirable bouncing effect. Or, if air is contained in an extensive bladder network of interconnected compressible cells (as opposed to the relatively contained environment of the cell 10), upon impact, the air may travel throughout the bladder and offer very little resistance to impact.

The preferred material, wall thickness, cell geometry and size and orifice size for the cell 10 of FIG. 6 will, of course, depend on the particular application for which the cell 10 is used, as well as the number of such cells used in a particular protective structure and the other elements and components of that structure. As noted, TPE materials are particularly well suited as the material for the cell 10. Arnitel® and Santoprene™ TPEs are two commercially available TPEs that can readily be blow-molded to the desired shape and configuration of the cell 10 and that exhibit excellent resiliency and durability. Other materials that can be used for the cell 10 include thermoplastic polyurethane elastomers (TPUs) and low density polyethylene (LDPE).

Figure 12:
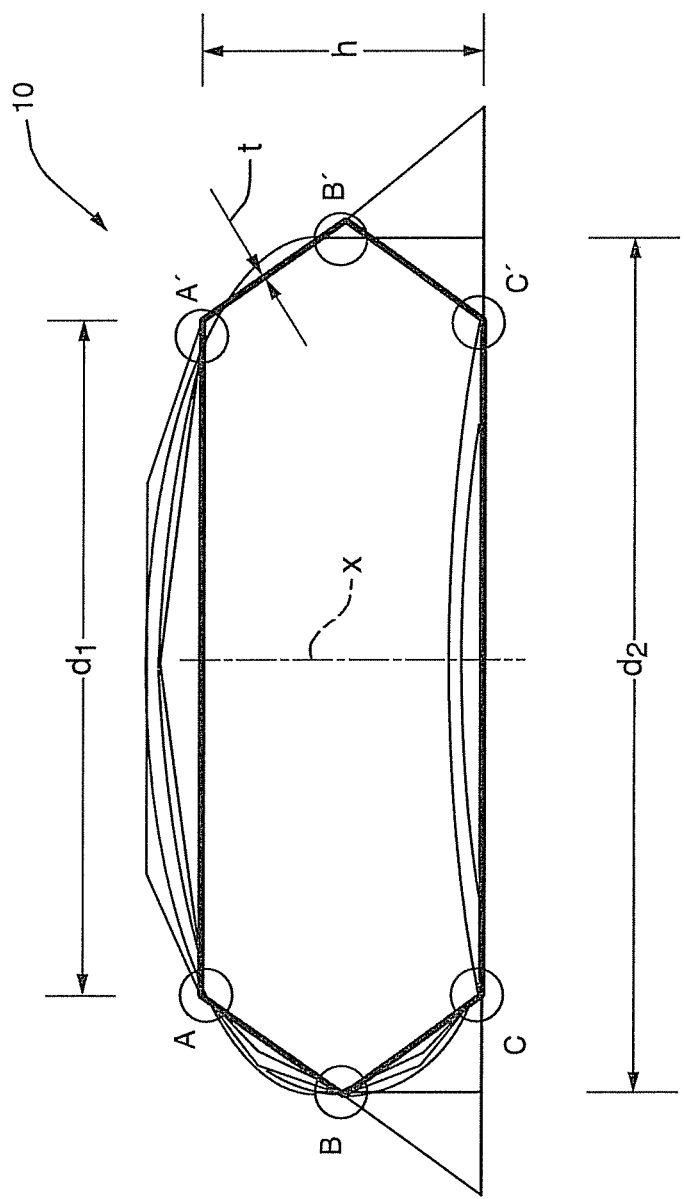
FIG. 12 is a schematic illustration showing a cross section and geometric details of a preferred cell embodied in accordance with the invention.

FIG. 12 of the drawings is a schematic illustration showing a cross-section and geometric and dimensional details of a preferred cell 10 embodied in accordance with the invention. The preferred cell cross-section is represented by the bolder or thicker lines in FIG. 12. The cell 10 of FIG. 12 is preferably symmetrical about its central axis X so that any cross-section of the cell 10 along a plane normal to the axis X forms a circle. As noted above, this helps assure that the response of the cell 10 is the same regardless of the location and angle of the impact. When the cell 10 is cross-sectioned in side elevation at any diameter, such as shown, for example, in FIG. 12, the edges of the cell form a symmetrical shape that passes through a specific set of points arranged in a specific pattern. These points, which may be circles in the case where the edges of the cell 10 are rounded, are labeled A, A', B, B', C, and C' in FIG. 12. In the pattern, the points B and B' are equidistant between A and C and A' and C', respectively. The angle formed by the lines AC and AB is greater than zero and less than 45°. The same is true of the angles formed by the lines CA and CB, A'C' and A'B' and C'A' and C'B', respectively. Accordingly, the lines AB and BC define an obtuse included angle as do lines A'B' and B'C'. Other cell cross-sectional shapes that satisfy this definition, and that are potentially suitable for use for the cell 10 in accordance with the invention, are represented by the lighter, thinner lines in FIG. 12.

Figure 13A:
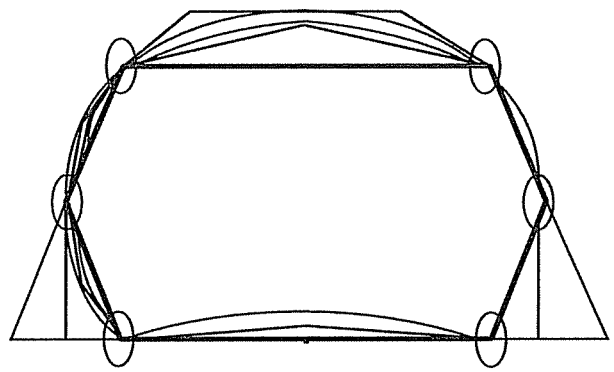
FIG. 13 is a schematic illustration showing cross sections of other cell shapes potentially suitable for the invention.
Figure 13B:
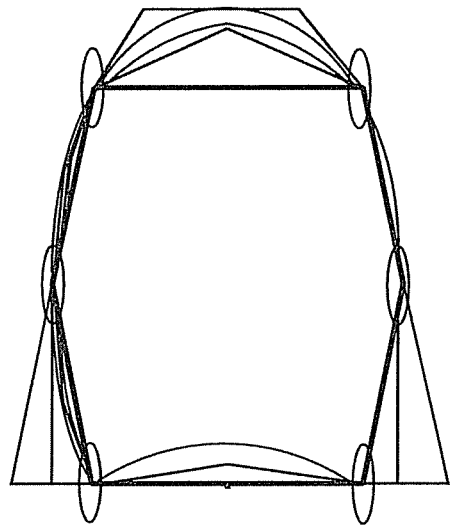

FIG. 13 illustrates other cross-sectional shapes that are potentially suitable for use for the cell 10 in accordance with the invention.

As noted above, the specific shape and dimensions of the cell 10 will depend to some extent on the particular application to which it is put. A cell like cell 10 of FIG. 12 that is intended for use in a protective structure, such as that illustrated in, and described below in connection with, FIG. 17 of the drawings, along with a plurality of identical cells 10, shaped and configured for use as protective headgear may have the following dimensional and other details. The height h of the cell 10 of FIG. 12 is about 1.0 inch, the diameters $d_1$ of its top and bottom walls are about 1.75 inches, and its medial diameter $d_2$ is about 2.00 inches. The material of the cell 10 is Arnitel® TPE. The wall thickness t of the cell enclosure 12 may be in the range of about 1.0 to about 3.00 mm, with a typical thickness (t) of about 2.00 mm. The diameter of the orifice 16 (see FIG. 6) may be in the range of about 1.0 mm to about 5.00 mm, with a typical orifice diameter being about 2.5 mm. It will be appreciated that a variation in any one of these dimensions and/or angles may require a corresponding adjustment of the other dimensions and/or angles since all values are interrelated. The optimum combination of values for a given application may be readily determined through sample testing without undue experimentation.

Figure 14:
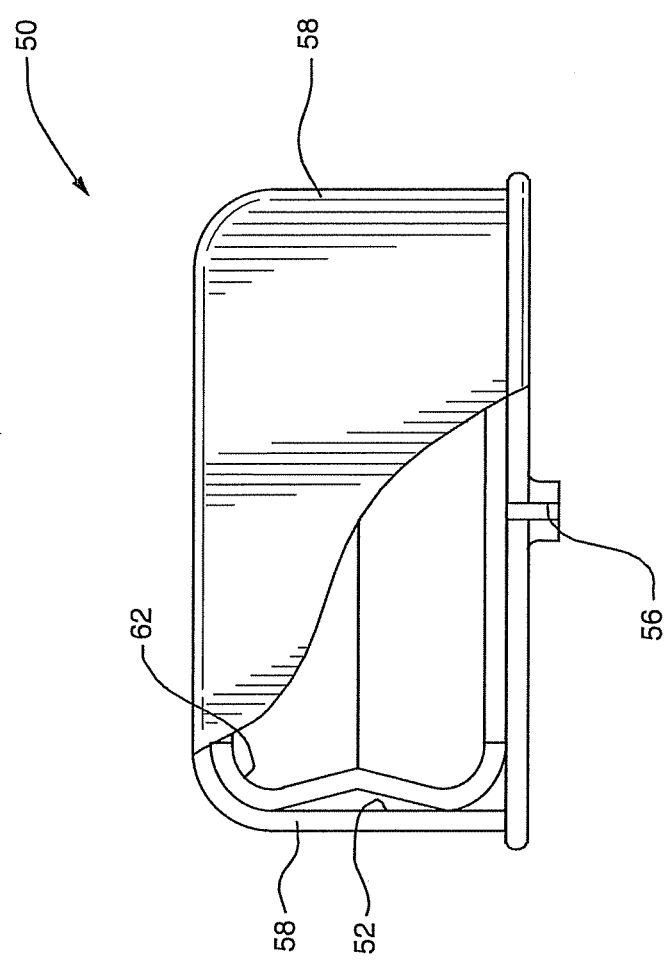
FIG. 14 is a side view, partly in section, of a second embodiment of the invention in which the initially resistive mechanism comprises a resiliently collapsible ring positioned inside the cell.

FIG. 14 shows an alternative embodiment of the invention in the form of a compressible cell 50 which is similar in design to the cell 10 described previously. However, in the cell 50, the initially resistive mechanism is provided by a component that is separate from the enclosure 52 of the cell 50 but that coacts with the enclosure 52 to provide the desired initial resistance. In this illustrative embodiment, the initially resistive component comprises a resilient plastic ring 62 that is positioned within the cell 50's enclosure 52. The cell 50 has generally vertical side walls 58 that can be relatively compliant so that they provide little resistance to collapse in response to an impact. The internal ring 62, however, is designed to resist collapse during the initial phase of an impact, much the same way that the side walls 18 in the cell 10 do, and then strategically buckle inwardly and collapse, allowing the fluid venting through the orifice 56 of the cell 50 serve as the mechanism for handling the remainder of the impact Like the cell 10, the properties of the cell 50 and its internal ring 62 can be engineering to yield a nearly trapezoidal, flattened Force/Time curve in response to a wide range of impact energies.

The ring 62 may be fabricated separately from the enclosure 52 of the cell 50 and inserted inside the cell enclosure 52 before the bottom wall 54 is secured. The ring 62 may be bonded at its top and bottom edges to the inside surfaces of the enclosure 52. It will be appreciated that the initially resistive component could also be disposed outside of the cell enclosure 52 around the perimeter of the cell 50.

Figure 15:
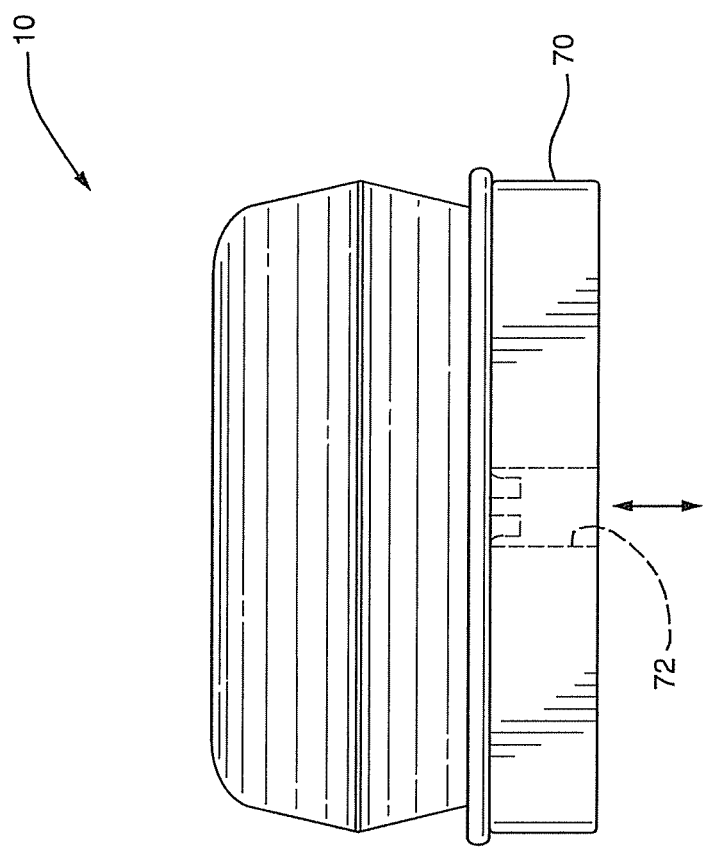
FIG. 15 is a side view, partly in section, of a third embodiment of the invention in which a cell such as that shown in FIG. 6 is combined with foam base plate to enhance the shock-absorbing response and durability of the cell.

FIG. 15 shows another embodiment of the invention in which a compressible cell, such as cell 10 of FIG. 6, is combined with a base plate 70 of conventional foam. The foam base plate 70 may be bonded or otherwise secured to the cell 10 and may have a central aperture 72 which allows fluid to flow freely out of the cell 10 during an impact and back into the cell 10 at the end of the impact. The foam base plate 70 improves the combined cell 10's ability to attenuate and absorb impacts and improves the durability of the cell 10, i.e., its ability to withstand multiple impacts with minimal damage and degradation of its performance.

Figure 16:
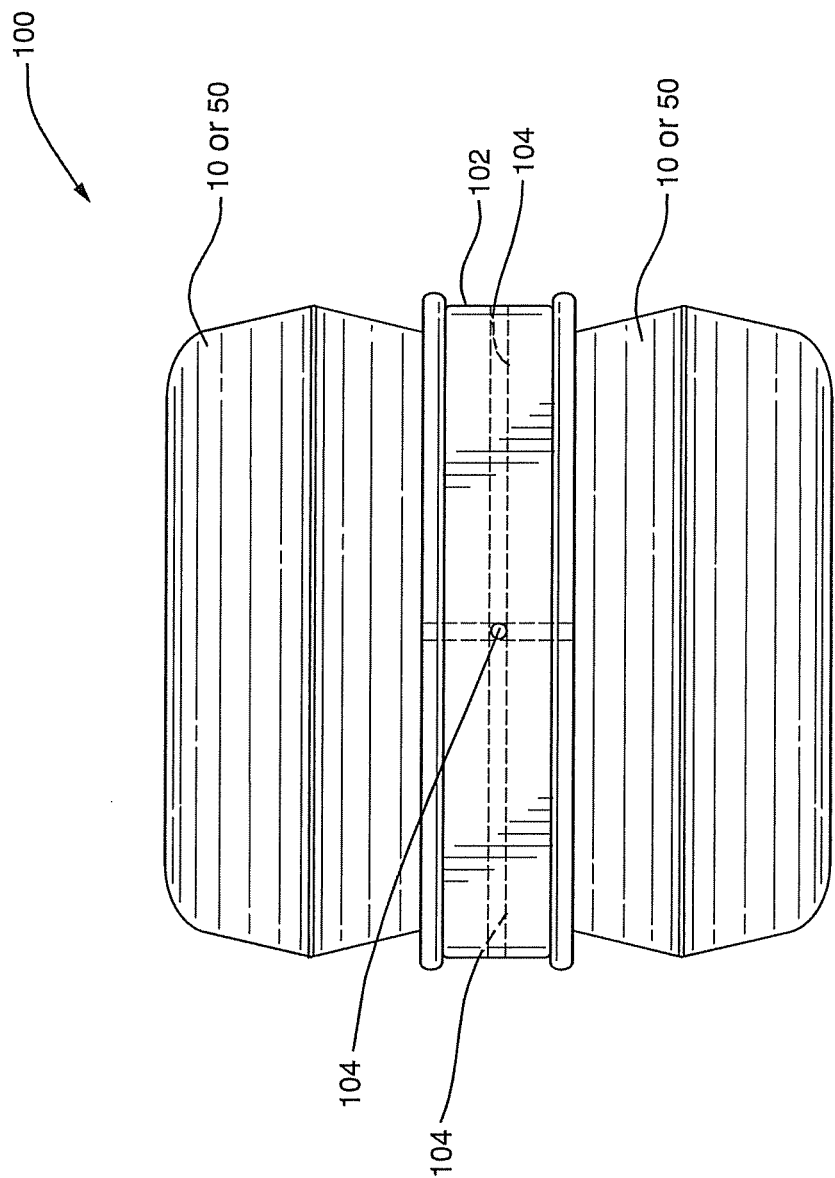
FIG. 16 is a side view of a fourth embodiment of the invention in which a cell such as that shown in FIG. 6 is combined with a second cell of similar construction.

FIG. 16 illustrates still another embodiment to the invention, in which a protective structure 100 includes a pair of compressible cells, such as cell 10 of FIG. 6 or cell 50 of FIG. 14, joined to opposite sides of a common base plate 102. The upper cell 10 or 50 is oriented so that it vents downwardly on impact. The lower cell 10 or 50 is oriented so that it vents upwardly on impact. The base plate 102, which may be of foam or other plastic, is provided with several counter-extending, radial passageways 104 which allow fluid to vent laterally from the cells 10 or 50 upon impact and to return laterally to the cells 10 or 50 after impact. Although the cells 10 or 50 in FIG. 16 are shown to be of the same relative size, it will be appreciated that they could be of different sizes, e.g., the lower cell 10 or 50 could be smaller than the upper cell 10 or 50, to conserve space and to make the structure less bulky.

Figure 17:
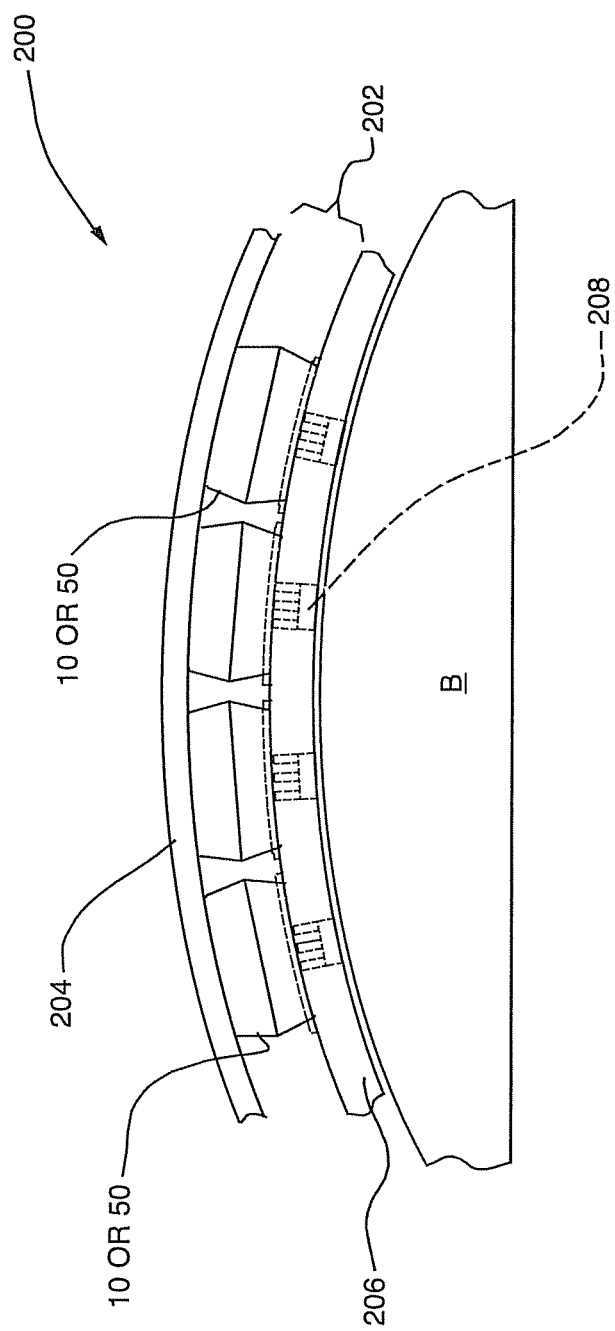
FIG. 17 shows a plurality of cells such as the cells shown in FIG. 6, 14, 15 or 16 arranged side-by-side to form a middle layer of a multilayered protective structure having an outer shell and an inner layer.

FIG. 17 is a cross-sectional view of an embodiment of a multilayer protective shell structure 200 for protecting a body B from damage due to impacts. The protective structure 200 comprises a plurality of compressible cells, such as cell 10 of FIG. 6 or cell 50 of FIG. 14, arranged side-by-side in a middle layer 202 between an outer shell 204 and an inner layer 206. The outer shell 204 may be a relatively thin, relatively hard plastic layer that deforms locally and radially in response to an impact. The inner layer 206 may be of a conventional foam. The cells 10 or 50 may be bonded to the inside surface of the outer shell 204 and/or to the outside surface of the inner layer 206, or semi-permanently secured thereto by releasable fasteners (not shown). The inner layer 206, like the foam base plate 70 in the embodiment of FIG. 15, may be provided with a plurality of apertures 208 which allow fluid that vents from the cells 10 or 50 to pass through the inner layer 206 to the body B during an impact. It will be appreciated that, because of the resilient nature of the cells 10 or 50, the outer shell 204 will not only deform in response to radial components of an impact, which components will be effectively absorbed by the cells 10 or 50 and inner layer 206, but also will shear relative to the inner layer 106 in response to tangential components of an impact, absorbing those components as well.

The layered structure 200 of FIG. 17 is particularly suited for use in the construction of protective headgear to protect the head of a wearer from impact-related concussions and other injury. Specific configurations and implementations of the layered structure 200 include safety helmets, motorcycle helmets, bicycle helmets, ski helmets, lacrosse helmets, hockey helmets, football helmets, batting helmets, headgear for rock or mountain climbing and headgear for boxers. Other applications include helmets used on construction sites, in defense and military applications, and for underground activities.

Figure 18:
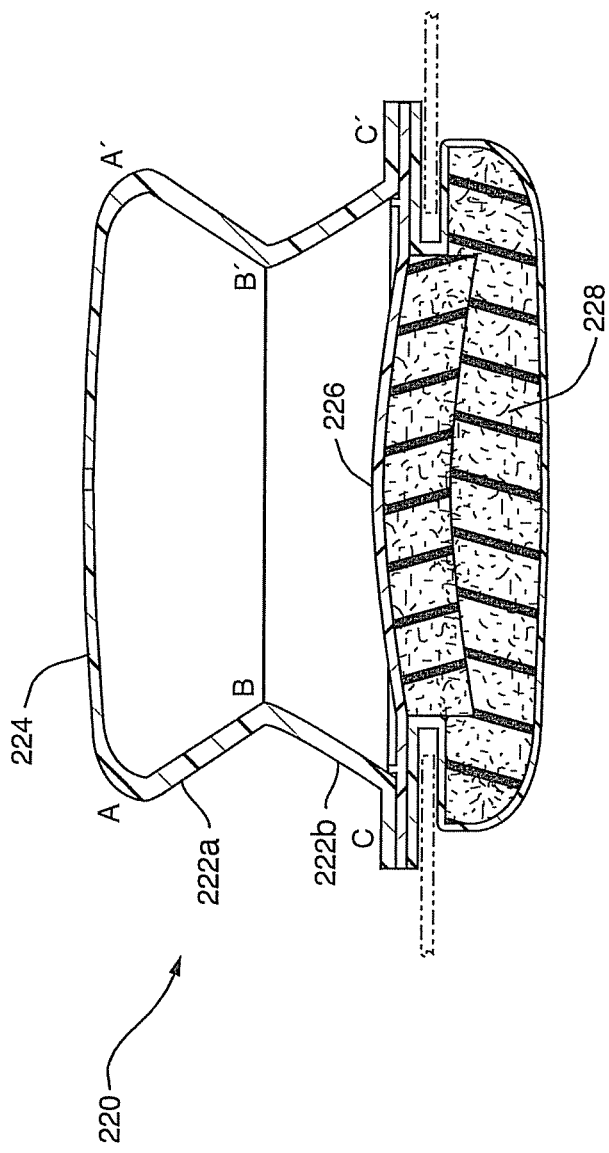
FIG. 18 is a sectional view of a fifth embodiment of the invention in which the cell has inverted side walls.

Refer now to FIG. 18 which illustrates another cell embodiment 220 which is similar to the cell 10 depicted in FIG. 12 except that its back-to-back frustoconical side walls 222a and 222b extending between parallel top and bottom walls 224 and 226 are inverted. In other words, walls 222a, 222b toe in toward the cell axis, meeting at the medial plane of the cell. In this case, the obtuse included angle defined by lines AB and BC (and lines A'B' and B'C') is an exterior included angle. Thus, when the cell 220 collapses, the side walls 222a, 222b move inward toward the cell axis, thereby reducing the volume of the cell and further compressing the air therein. Accordingly, cell 220 has a somewhat higher resistance to collapse during the initial phase of an impact than the cell 10 in FIG. 12 whose obtuse included angle is an interior angle and whose side walls collapse outwardly. The cell 200 also has a resilient pad structure secured to the cell wall or baseplate 226.

It will also be appreciated that the cells 10, 50 and 220, as well as the layered structure 200, may be adapted for use in a wide variety of other impact-absorbing and shock-attenuating applications.

In summary, what we have described is a compressible cell 10, 50 or 220 that possesses a unique combination of elements and properties that can be individually selected and adjusted and that act in coordination with one another to manage impact energy in a novel manner. Specifically, the cells provide the following benefits:

(a) multiple customization options;
(b) phased resistance offered by different impact-absorbing mechanisms (allows shaping of force curve and reduction in peak force);
(c) increased "ride-down" and avoidance of increasing density with compression (leads to flattening of force curves and reduction in peak forces without the need for increased thickness);
(d) adaptation to varying impact energy levels; and
(e) superior durability compared to foam.

While the invention has been shown and described with reference to specific embodiments, it will be understood by the skilled in the art that various modification and additions may be made to the described embodiments without departing from the scope of the invention as defined by the appended claims. For example, it will be appreciated that the cells may be provided with more than one orifice and that the location, size and configuration of the orifices may vary. Specifically, a separate orifice with a one-way valve may be provided through which air flows to refill the cell after an impact. In such a case, the outflow orifice or orifices can be relatively small or in the form of slits, so that they provide optimum resistance to an impact, while the inflow orifice or orifices may be relatively large to allow rapid refill of the cell after the impact. Those skilled in the art will also appreciate that numerous other mechanisms may be devised and used to provide the cell with the desired resistance to collapse during the initial phase of the impact. It is thus the intent of the appended claims to cover these and other modifications that may be made by those skilled in the art.

What is claimed is:

1. A compressible cell for absorbing impact forces imparted thereto, comprising:
   an enclosure comprising a side wall that resists yielding in response to an impact during an initial phase thereof and that yields to the impact after the initial phase, the enclosure defining an inner chamber for containing a fluid; and
   at least one orifice in the enclosure for resistively venting fluid from the inner chamber so as to at least partially absorb the impact after the initial phase,
   wherein the side wall is configured to move inwardly when yielding so as to reduce a volume of the inner chamber and compress the fluid therein.

2. The cell of claim 1, wherein the side wall comprises a pair of back-to-back frustoconical walls extending between parallel top and bottom walls and toeing in to meet at a medial plane of the cell.

3. In a safety article comprising a compressible cell that includes an enclosure defining an inner chamber and having an orifice and a side wall, a method for protecting a body from damage due to impacts, the method comprising:
   absorbing an impact imparted on the cell at least partially with the side wall by resisting yielding during an initial phase of the impact; and
   after the initial phase, compressing fluid in the inner chamber by inward motion of the side wall, and absorbing the impact at least partially by venting fluid from the inner chamber through the orifice.

* * * * *